US012632526B2

(12) United States Patent
McGrandle et al.

(10) Patent No.: US 12,632,526 B2
(45) Date of Patent: May 19, 2026

(54) SYSTEMS AND METHODS FOR CONTINUOUS USER AUTHENTICATION

(71) Applicant: Mastercard Technologies Canada ULC, Vancouver (CA)

(72) Inventors: Jonathan McGrandle, Maple Ridge (CA); Roshan Lewis, Bernardsville, NJ (US); David J. Senci, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 170 days.

(21) Appl. No.: 17/401,172

(22) Filed: Aug. 12, 2021

(65) Prior Publication Data

US 2023/0052407 A1 Feb. 16, 2023

(51) Int. Cl.
| | |
|---|---|
| *G06F 21/31* | (2013.01) |
| *G06Q 20/24* | (2012.01) |
| *G06Q 20/34* | (2012.01) |

(52) U.S. Cl.
CPC .......... *G06F 21/316* (2013.01); *G06Q 20/24* (2013.01); *G06Q 20/34* (2013.01); *G06F 2221/2139* (2013.01)

(58) Field of Classification Search
CPC .......... G06F 21/316; G06F 2221/2139; G06F 21/34; G06Q 20/24; G06Q 20/34; G06Q 20/4014
USPC ........................................................ 726/19
See application file for complete search history.

(56) References Cited

U.S. PATENT DOCUMENTS

| | | | |
|---|---|---|---|
| 8,364,971 | B2 | 1/2013 | Bell et al. |
| 8,590,018 | B2 | 11/2013 | Thavasi et al. |
| 8,660,322 | B2 | 2/2014 | Tsai et al. |
| 8,832,798 | B2 | 9/2014 | Thavasi et al. |
| 9,336,373 | B2 * | 5/2016 | Ramachandran ..... G06F 21/316 |

(Continued)

FOREIGN PATENT DOCUMENTS

| | | | |
|---|---|---|---|
| EP | 3009950 B1 | 9/2019 | |
| WO | WO-2013058781 A1 * | 4/2013 | ............. G06F 21/41 |
| WO | 2019190619 A1 | 10/2019 | |

OTHER PUBLICATIONS

PCT International Search Report and Written Opinion, Application No. PCT/CA2022/051224, dated Oct. 3, 2022, 12 pps.

(Continued)

*Primary Examiner* — Jacob Lipman
(74) *Attorney, Agent, or Firm* — Armstrong Teasdale LLP

(57) ABSTRACT

A computer device configured to passively authenticate a user includes a memory device including a user profile, and at least one processor coupled to the memory device. The at least one processor is programmed to execute a passive authentication system programmed to receive an indication that the user successfully performed an active authentication by interacting with the computing device, and set an authentication state of the user as authenticated in response to the successful active authentication. The passive authentication system is further programmed to receive a first plurality of interaction data indicative of one or more interactions between the user and the computer device, the one or more interactions performed after the indication of the successful active authentication; compare the one or more interactions to the user profile; and update the authentication state of the user based on the comparison.

20 Claims, 6 Drawing Sheets

(56) References Cited

U.S. PATENT DOCUMENTS

| | | | |
|---|---|---|---|
| 9,684,775 B2 | 6/2017 | Gupta et al. | |
| 10,019,561 B1 | 7/2018 | Shelton et al. | |
| 10,185,817 B2 | 1/2019 | Gupta et al. | |
| 10,223,696 B2 | 3/2019 | Chen et al. | |
| 10,389,706 B2 | 8/2019 | Vincent et al. | |
| 10,496,801 B2 | 12/2019 | Hamlin et al. | |
| 10,867,612 B1 | 12/2020 | Pollack et al. | |
| 11,055,388 B2 | 7/2021 | Derakhshani et al. | |
| 2010/0332550 A1* | 12/2010 | Ainslie | G06F 21/316 |
| | | | 709/224 |
| 2011/0047608 A1* | 2/2011 | Levenberg | H04L 63/0807 |
| | | | 726/7 |
| 2013/0067546 A1* | 3/2013 | Thavasi | G06F 21/31 |
| | | | 726/7 |
| 2014/0143090 A1* | 5/2014 | Deyle | G06Q 10/0833 |
| | | | 705/26.35 |
| 2015/0310444 A1 | 10/2015 | Chen et al. | |
| 2015/0373007 A1* | 12/2015 | Sheller | G06F 21/316 |
| | | | 726/6 |
| 2016/0063503 A1 | 3/2016 | Kobres et al. | |
| 2016/0110528 A1* | 4/2016 | Gupta | H04L 63/08 |
| | | | 726/19 |
| 2016/0182502 A1* | 6/2016 | Smith | H04L 63/0884 |
| | | | 726/7 |
| 2016/0182503 A1 | 6/2016 | Cheng et al. | |
| 2016/0205094 A1 | 7/2016 | Harthattu et al. | |
| 2017/0109751 A1* | 4/2017 | Dunkelberger | G06Q 20/4014 |
| 2017/0227995 A1 | 8/2017 | Lee et al. | |
| 2017/0337364 A1 | 11/2017 | Whaley et al. | |
| 2018/0131692 A1 | 5/2018 | Katz-Oz et al. | |
| 2018/0247034 A1 | 8/2018 | Goldsmith et al. | |
| 2019/0272361 A1 | 9/2019 | Kursun et al. | |
| 2019/0325119 A1 | 10/2019 | Kobres et al. | |
| 2020/0125711 A1 | 4/2020 | Ghose et al. | |
| 2020/0169566 A1 | 5/2020 | Wolf et al. | |
| 2020/0288315 A1* | 9/2020 | Hanley | G06Q 20/4016 |
| 2021/0160687 A1* | 5/2021 | Ross | G06N 3/044 |
| 2021/0182370 A1 | 6/2021 | Melnikov et al. | |

OTHER PUBLICATIONS

Abuhamad et al., "Sensor-Based Continuous Authentication of Smartphones' Users Using Behavioral Biometrics: A Contemporary Survey", IEEE Internet of Things Journal, vol. 8, No. 1, Jan. 1, 2021, pp. 65-84.

Ayeswarya et al., "A Survey on Different Continuous Authentication Systems", International Journal of Biometrics, vol. 11, No. 1, Jan. 1, 2019, pp. 67-99.

Fu et al., "Continuous User Authentication Based on Context-Emphasized Behavior Profiling", Proceedings of IEEE 42rd Annual Computer Software and Applications Conference (COMPSAC), Jul. 15, 2019, pp. 598-603.

* cited by examiner

SYSTEMS AND METHODS FOR CONTINUOUS USER AUTHENTICATION

BACKGROUND

The present application relates generally to authenticating users of computing devices, and more particularly, to maintaining an authenticated state of users based on passive device interactions and characteristics.

For many computer-based processes, authentication procedures are often implemented to verify that the user of a computing device is, in fact, the authorized or legitimate user. For example, authentication may be required to access secure applications on the computing device or a remote website, or to verify that a user of the computing device is a legitimate user of a payment card account proffered for an online transaction.

Some authentication systems implement strong consumer authentication (SCA) (or just "strong authentication") for certain transactions. For example, a remote website proprietor or an issuing bank of a payment account may insist on authenticating consumers (e.g., with a PIN, a one-time passcode sent by SMS text message, a challenge question, etc.) during online interactions. Such tools may help authenticate identity of the user of a computing device, but they may also consume computing resources and/or increase friction with the user, which sometimes leads to the interaction or relationship with the requestor being abandoned.

Accordingly, it is desirable to have authentication methods that are capable of performing authentication services while improving the user experience and still maintaining confidence in the authentication.

BRIEF DESCRIPTION

In one aspect, a computer device configured to passively authenticate a user is provided. The computer device includes a memory device including a user profile, and at least one processor coupled to the memory device. The at least one processor is programmed to execute a passive authentication system. The passive authentication system is programmed to receive an indication that the user successfully performed an active authentication by interacting with the computing device, and set an authentication state of the user as authenticated in response to the successful active authentication. The passive authentication system is further programmed to receive a first plurality of interaction data indicative of one or more interactions between the user and the computer device, the one or more interactions performed after the indication of the successful active authentication, compare the one or more interactions to the user profile, and update the authentication state of the user based on the comparison.

In another aspect, a method for passively authenticating a user is provided. The method is implemented via a computer device comprising a memory device including a user profile and at least one processor coupled to the memory device. The method includes receiving an indication that the user successfully performed an active authentication by interacting with the computing device. The method also includes setting an authentication state of the user as authenticated in response to the successful active authentication. The method further includes receiving a first plurality of interaction data indicative of one or more interactions between the user and the computer device, the one or more interactions performed after the indication of the successful active authentication. In addition, the method includes comparing the one or more interactions to the user profile. Moreover, the method includes updating the authentication state of the user based on the comparison.

In a further aspect, a non-transitory computer-readable storage medium having computer-executable instructions embodied thereon is provided. When executed by a computing device comprising a processor communicatively coupled to a memory, the computer-executable instructions cause the computing device to receive an indication that the user successfully performed an active authentication by interacting with the computing device. The computer-executable instructions also cause the computing device to set an authentication state of the user as authenticated in response to the successful active authentication. The computer-executable instructions further cause the computing device to receive a first plurality of interaction data indicative of one or more interactions between the user and the computer device, the one or more interactions performed after the indication of the successful active authentication. In addition, the computer-executable instructions cause the computing device to compare the one or more interactions to the user profile. Moreover, the computer-executable instructions cause the computing device to update the authentication state of the user based on the comparison.

BRIEF DESCRIPTION OF THE DRAWINGS

FIG. 1 is a schematic diagram illustrating an example multi-party payment card system for processing payment transactions in accordance with one embodiment of the present disclosure.

FIG. 2 is a block diagram of an example embodiment of a system including a user device using passive authentication in accordance with one example embodiment of the present disclosure.

FIG. 3 illustrates an example process for performing passive authentication using the system shown in FIG. 2.

FIG. 4 illustrates another example process for performing passive authentication using the system shown in FIG. 2.

FIG. 5 illustrates an example configuration of a server system that may be used to implement at least one component shown in FIGS. 1 and 2.

FIG. 6 illustrates an example configuration of a client system that may be used to implement the user device shown in FIG. 2.

Figure 1:
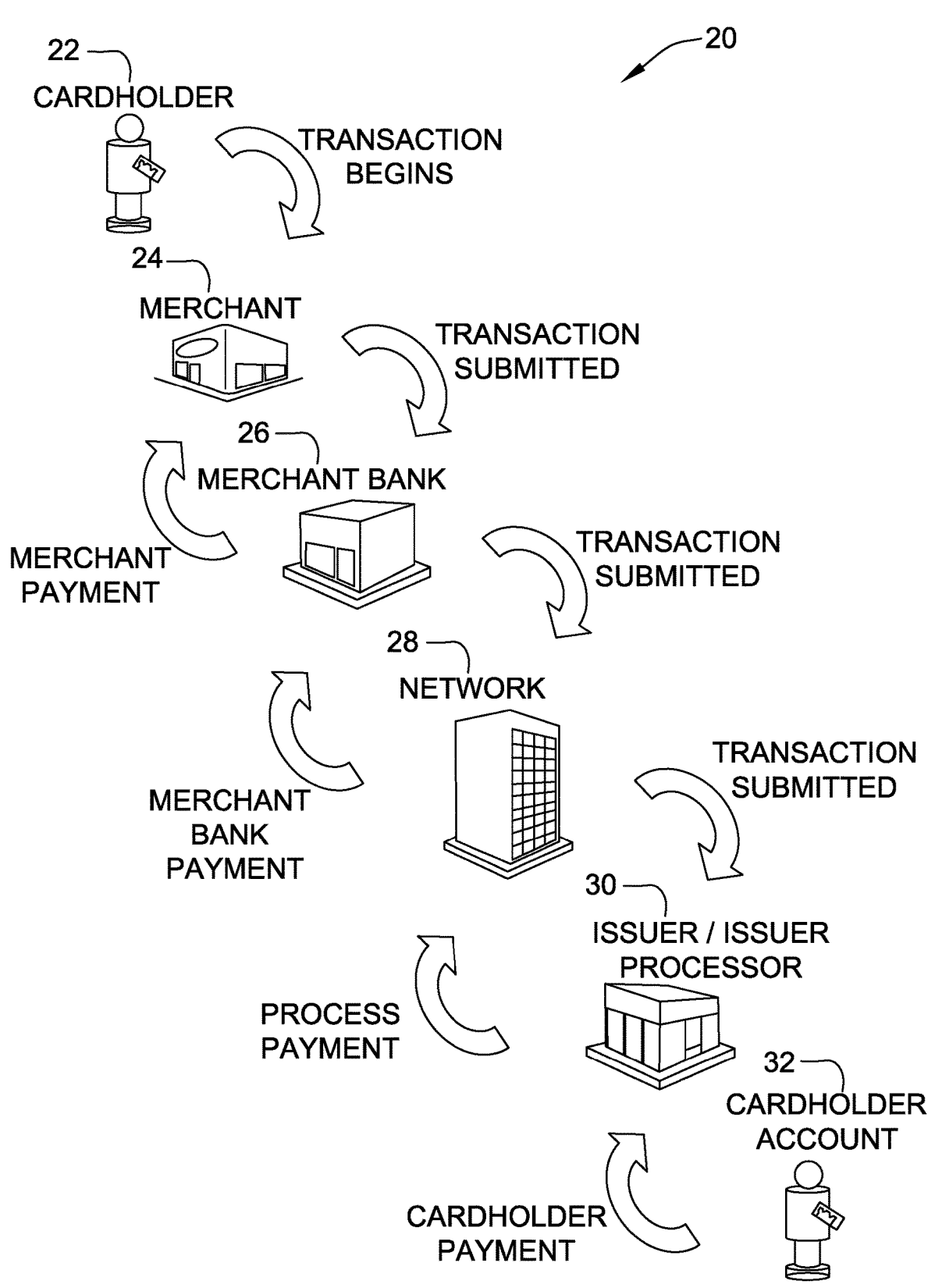
FIGS. 1-6 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to authenticating a user of a computing device that is in network communication with other computing devices using a passive authentication system. The passive authentication system tracks the actions of the user and the conditions of a user device associated with the user after the user has performed an authentication on the user device. The passive authentication system determines if the actions of the user and the condition of the user device are within the normal profile of use of the user for that specific device. If the actions and conditions match the normal profile of use, the passive authentication system can consider the user to still be authenticated and report that to applications and systems that request authentication, without requiring the user to re-authenticate themselves to the device or application trying to be accessed. The passive authentication system described herein may be used in a variety of applications including a payment transaction initiated using a payment card (e.g., card-present or card-not-present transactions) or some other payment device used to initiate a network based transaction.

At least one of the technical problems addressed by this system includes: (i) high network load and/or transaction latency caused at least in part on step-up challenging most or all card-not-present transactions, which results in network delays and reduced bandwidth; (ii) allowing fraudulent transactions to be successfully processed if there is no step-up challenge of a card-not-present transaction; (iii) consumer inconvenience during card-not-present transactions based at least in part on having to answer an additional authentication challenge during a transaction; (iv) abandonment of transactions by consumers when faced with a step-up challenge, thus leading to lost sales for merchants and lost processing fees for the other network parties based on those abandoned transactions; (v) unavailability of customizable fraud-related services to merchants, merchant acquirers, and/or computer devices; (vi) consumer time required to complete a transaction due to the number of steps required the authentication process; and (vii) increased processing load of the authenticating computer device due to redundant authentication processes for a same user.

A technical effect of the systems and processes described herein is achieved by performing at least one of the following steps: (i) receive an active authentication of the user; (ii) set an authentication state of the user based on the active authentication; (iii) receive one or more interactions between the user and the computer device; (iv) compare the one or more actions to the user profile; (v) set the authentication state of the user based on the comparison; (vi) determine one or more conditions of the computer device, wherein the one or more conditions include a battery state of the computer device, a current location of the computer device, an orientation of the computer device, a wireless connection to a network, and a wireless connection to another device; (vii) compare the one or more conditions of the computer device to the user profile; (viii) determine the authentication state of the user based on the comparison; (ix) receive a request to access a secure application; (x) determine the authentication state of the user; (xi) allow or deny access to the secure application based on the authentication state of the user; (xii) determine the authentication state of the user as authenticated based on the active authentication; (xiii) subsequent to the active authentication, receive a plurality of actions of the user on the computer device, wherein the plurality of actions of the user are between the active authentication and a current time; (xiv) determine the authentication status of the user at the current time based on the plurality of actions of the user; (xv) compare the plurality of actions of the user to the user profile to determine the authentication status of the user; (xvi) receive a plurality of user actions over a period of time; (xvii) determine the user profile based on the received plurality of user actions; (xviii) detect a user action that does not match the user profile; and (xix) set the authentication state of the user to not authenticated based on the user action that does not match.

As will be appreciated based on the description herein, the technical improvement in the authentication system as described herein is a computer-based solution to a technical deficiency or problem that is itself rooted in computer technology (e.g., the problem itself derives from the use of computer technology). More specifically, fraud is a significant problem for transactions conducted over an electronic payment network, especially for card-not-present transactions. Many current systems require that users be re-authenticated at multiple points during a period of online activity in order to provide an acceptable level of verification; however, this can cause the user to become disinterested in the associated transaction, causing issues for merchants. Furthermore, re-authentication of a user increases network traffic and processing load. Accordingly, to address the technical deficiency of conventional systems of inability to maintain confidence in an authentication process previously performed during a period of online activity, the systems and methods described herein use a passive authentication system to monitor the actions of the user and conditions of an associated user device to determine if the user of the user device is still the individual that performed a previous authentication on the user device, and whether or not that previous authentication still suffices for the user device and its associated applications.

The following detailed description of the embodiments of the disclosure refers to the accompanying drawings. The same reference numbers in different drawings may identify the same or similar elements. Also, the following detailed description does not limit the claims.

Described herein are computer systems such as passive authentication computer systems and user devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium.

In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating an example multi-party payment card system 20 for processing payment transactions in accordance with one embodiment of the present disclosure. Embodiments of the passive authentication system 120 (shown in FIG. 2) described herein may be used to authenticate users who proffer a payment card account for a transaction processed by multi-party payment card system 20 as legitimate users of the proffered account. However, passive authentication system 120 as described herein is also operable in environments other than multiparty payment card system 20.

FIG. 1 depicts a flow of data in a financial transaction through system 20. Embodiments described herein may relate to a transaction card system, such as a credit card payment system using the MASTERCARD® interchange network. The MASTERCARD® interchange network is a set of proprietary communications standards promulgated by Mastercard International Incorporated® for the exchange of financial transaction data and the settlement of funds between financial institutions that are members of Mastercard International Incorporated®. (MASTERCARD® is a registered trademark of Mastercard International Incorporated located in Purchase, New York).

In the exemplary transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." Merchant 24 receives cardholder's 22 account information as provided by cardholder 22. When cardholder 22 tenders payment for a purchase with a transaction card or virtual transaction card, for example online or by presenting a physical payment instrument or digital wallet-enabled device, merchant 24 requests authentication of the cardholder 22 and authorization from a merchant bank 26 for the amount of the purchase. The authorization request may be performed electronically or over the telephone, or through the use of a point-of-sale terminal, which reads cardholder's 22 account information from a digital wallet-enabled device, a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or the merchant processor communicate with computers of an issuer bank 30 to determine whether cardholder's 22 account 32 is in good standing, and whether the purchase is covered by cardholder's 22 available credit line. Messages among these parties are typically formatted according to known international standards, such as ISO 8583 and ISO 20022. Based on these determinations, the request for authorization will be declined or accepted. Issuer bank 30 may require that an authentication process be performed prior to authorization, in order to provide a level of confidence that the user tendering the account for payment is a legitimate user of the account, rather than a fraudster. If the request for authorization is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction may be settled between issuer bank 30 and interchange network 28, and then between interchange network 28 and merchant bank 26, and then between merchant bank 26 and merchant 24.

As described below in more detail, passive authentication may be performed on behalf of an access control server (ACS) or issuer bank 30 in the context of multi-party payment card system 20. Although the systems described herein are not intended to be limited to facilitate such applications, the systems are described as such for example purposes.

Figure 2:
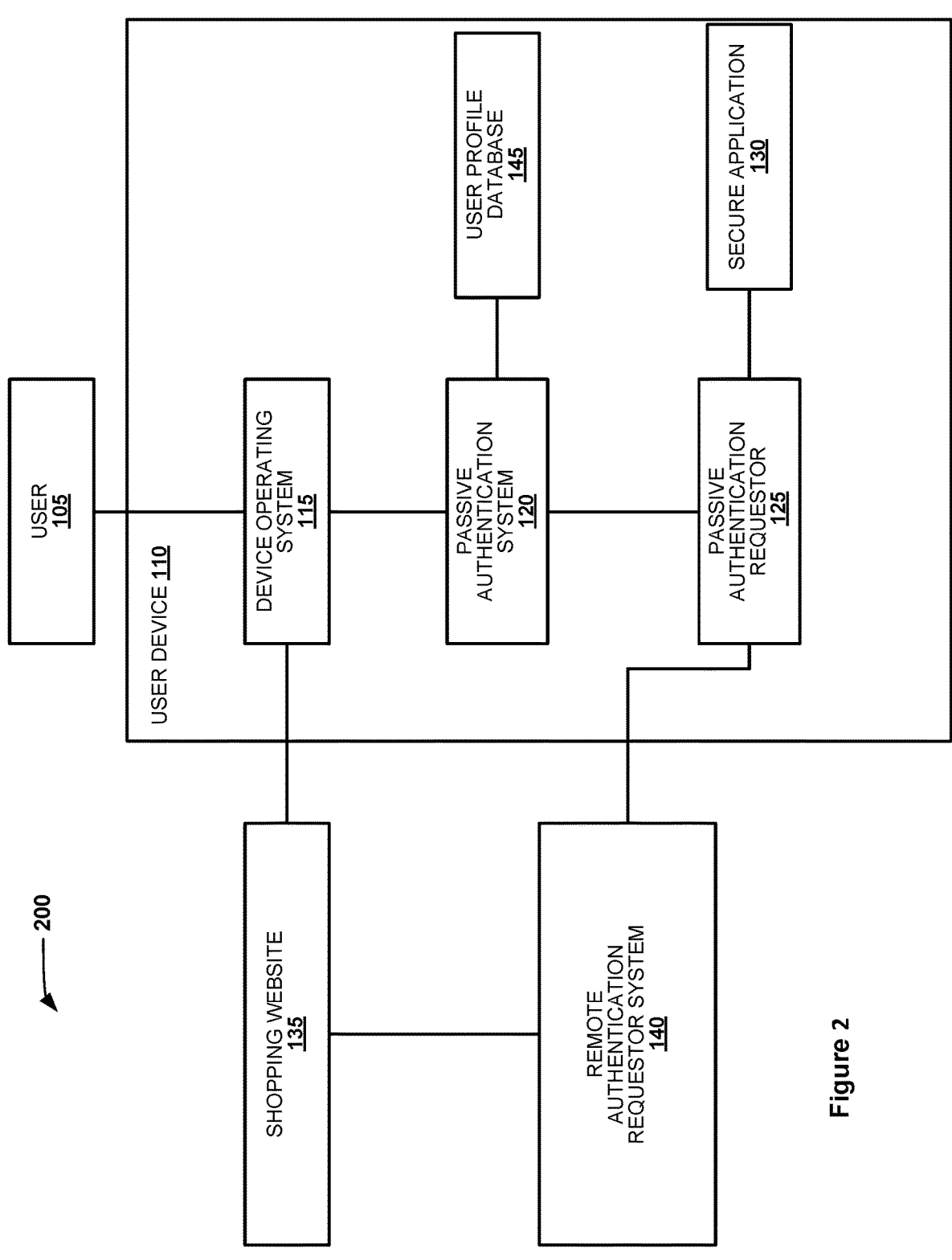

FIG. 2 is a block diagram of an example embodiment of a system 200 including a user device 110 using passive authentication in accordance with one example embodiment of the present disclosure.

In the exemplary embodiment, a user 105 is using a user device 110. The user computer device 110 executes a device operating system 115. In the exemplary embodiment, the device operating system 115 executes a passive authentication system 120 for passively authenticating the user 105 as described herein, and at least one passive authentication requestor 125 for controlling interactions with (e.g., passing user actions to and requesting authentication status from) the passive authentication system 120. In some embodiments, the device operating system 115 can be in communication with one or more remote websites 135. Each remote website 135 includes, or is associated with, a remote authentication requestor system 140 to authenticate the user 105 for activities on the corresponding remote website 135, such as when the user 105 is attempting to make a purchase on the corresponding remote website 135. The remote authentication requestor system 140 is in communication with the at least one passive authentication requestor 125.

Interactions with passive authentication system 120 can originate from any number of passive authentication requestors 125. In some embodiments, the at least one passive authentication requestor 125 includes one passive authentication requestor 125 preinstalled or provided by a manufacturer of user device 110, which mediates access to passive authentication system 120 by various remote authentication requestor systems 140 employed by the one or websites 135. Additionally or alternatively, certain remote websites 135 may provide a dedicated passive authentication requestor 125 to mediate access between the associated remote authentication requestor system 140 and passive authentication system 120. For example, user 105 may install a client shopping application on user device 110 for shopping on a first remote website 135, and the installation includes a first passive authentication requestor 125 configured to communicate with the client shopping application, and with the remote authentication requestor system 140 associated with the first remote website 135, to perform authentications of user 105 in connection with the user's activity on the first remote website 135. For another example, user 105 may visit a second remote website 135 using a browser application executing on user device 110, and during browsing the second remote website 135 may download a second passive authentication requestor 125 as an executable code snippet, configured to communicate with the remote authentication requestor system 140 associated with the second remote website 135 to perform authentications of user 105 in connection with the user's activity on the second remote website 135. In some embodiments, one or more passive authentication requestors 125 are in communication with one or more secure applications 130 executing on the device operating system 115. Alternatively, user device 110 includes solely a single passive authentication requestor 125 and/or the at least one passive authentication requestor 125 is provided by any suitable source. Although the passive authentication requestor 125 is a separately executable component in the exemplary embodiment, in other embodiments any or all functionality of passive authentication requestor 125 described herein may be embedded in passive authentication system 120.

In the exemplary embodiment, the user 105 intermittently performs an active authentication on the user device 110. The active authentication requires at least one explicit, authentication-specific user 105 interaction with the user device 110. Examples include, but are not limited to, a fingerprint scan, a facial scan (or some other biometric authentication), and entering a pin code or a password. The user 105 interacts with the device operating system 115 to perform the active authentication. The device operating system 115 informs the passive authentication system 120 of the successful active authentication. For example, the user 105 may enter their pin code or have their fingerprint scanned to unlock/access the user device 110 after a period of inactivity. In response to the active authentication, the passive authentication system 120 considers the user 105 to be initially authenticated. The passive authentication system 120 continues to monitor interactions with the user device 110 and the device operating system 115, as well the current status of the user device 110 and the device operating system 115, to determine whether further interaction with and/or status of the user device 110 remains consistent with usage by user 105.

In the exemplary embodiment, the passive authentication system 120 has previously monitored the user's actions with the user device 110 and the device operating system 115, as well the current status of the user device 110 and the device operating system 115, to build a user profile that includes the normal user actions and corresponding state of the user device 110 at different points in time. In the exemplary embodiment, the user profile is stored in a user profile database 145. The user profile can include, but is not limited to, average amount of charge for the user device 110 at different points in time during the day, different wireless networks that the user device 110 connects to at different points in the day, different wireless connections to different devices (such as over Bluetooth) at different points in the day, different locations of the user device 110 at different points in the day (such as through a GPS service in the user device 110), different orientations of the user device 110 throughout the day (such as upright in a stand or lying flat) and different types of user interactions with the user device 110 at different points in the day. In the exemplary embodiment, data regarding these interactions and statuses is captured in real-time or near real-time by the at least one passive authentication requestor 125 from device operating system 115, and passed by the at least one passive authentication requestor 125 as notifications to passive authentication system 120.

For example, the user profile may include information about how the user 105 usually checks one or more sports-related websites around 12:30 PM every work day. Other examples include connecting to different Wi-Fi networks at different times of day (i.e., work network, home network, and/or car or vehicle network), connecting to different devices in the user 105's local environment (e.g., "personal cloud") at different points in the day (e.g., a car infotainment system during commutes; a treadmill, stationary bike, or other exercise equipment before work; wireless earbuds during exercise time; a smartwatch during the work day), and the current location of the user device 110 during the day as pulled from a GPS component on user device 110 (e.g., at the office during working hours, at a restaurant near the office during lunch, at a day care during drop-off and pickup times, etc.)

In the exemplary embodiment, the passive authentication system 120 compares the user's actions/interactions with the user device 110 to the user's profile. If the actions are consistent with the user's profile, the passive authentication system 120 considers the user to still be authenticated after the active authentication. If the actions are inconsistent with the user's profile, such as the user runs an errand at lunch that is not part of a usual routine (e.g., going to the Department of Motor Vehicles to get license plates renewed), the passive authentication system 120 no longer considers the user 105 to be authenticated until the user performs another active authentication. In this way, actions inconsistent with the profile of user 105, which may in some cases indicate unauthorized use of user device 110 by another party, cause passive authentication system 120 to prevent access to applications and services that require authentication of user 105 absent another active authentication by user 105.

In an example, the user attempts to access a secure application 130 on the user device 110. As a prerequisite to granting access, the secure application 130 requests authentication information from one or more systems, such as the at least one passive authentication requestor 125. The passive authentication requestor 125 requests the current authentication status from the passive authentication system 120. If the user 105 is still authenticated, the passive authentication system 120 responds with an authenticated status response to passive authentication requestor 125. The passive authentication requestor 125 responds with the authenticated status to the secure application 130, and the secure application 130 then provides access to the user 105. In this way, if the user 105 has performed an active authentication and has since continued to follow actions consistent with their user profile, the user 105 will still be considered to be authenticated and will not have to perform an active authentication to access the secure application 130. Accordingly, the passive authentication system 120 relies on actions and device data, captured by passive authentication requestor 125 during independent, routine activity of the user 105, to maintain an authenticated status of the user, avoiding the need to interrupt the user with a redundant active authentication when the user later attempts to access a secure resource. This is an advantage over at least some known systems, which require the user 105 to perform another active authentication in response to each attempt to access the secure application 130, without regard to any intervening user actions or device data.

In some embodiments, if the passive authentication system 120 determines a "not authenticated" status, the passive authentication system 120 then causes, for example via the device operating system 115 and/or another authentication system (not shown) associated with the user device 110, a prompt to be displayed by user device 110 for the user to perform an active authentication on user device 110. In other embodiments, the passive authentication system 120 reports a non-authenticated status to passive authentication requestor 125, and the passive authentication requestor 125 causes the prompt to be displayed. Passive authentication system 120 then monitors subsequent user 105 actions and device data captured by passive authentication requestor 125 to maintain, as appropriate based on the captured data, the re-established authenticated status of user 105.

In the exemplary embodiment, when the user 105 accesses a website 135 that requires authentication, the website 135 requests authentication from the user device 110, such as through the remote authentication requestor system 140. The passive authentication requestor 125 requests authentication from the passive authentication system 120 and returns the authentication response from the passive authentication system 120 to the remote authentication requestor system 140. In some embodiments, at least one of the passive authentication system 120 and the passive authentication requestor 125 causes a prompt for an active authentication from the user 105 if the user 105 is not considered authenticated by the passive authentication system 120.

In the exemplary embodiment, the user device 110 is a computer that includes a web browser or a software application which enables user device 110 to access remote computer devices such as website 135, as discussed above, using the Internet or other network. More specifically, user device 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User devices 110 are typically mobile computing devices, such as a smartphone, a cellular phone, a personal digital assistant (PDA), a tablet, a phablet, wearable electronics, a smart watch, or other mobile device, but alternatively user device 110 may be any device capable of accessing the Internet including, but not limited to, a desktop computer, a laptop computer, or other web-based connectable equipment. In the exemplary embodiment, user devices 110 are associated with individual users 105, which may be individual cardholders 22 (shown in FIG. 1).

In the exemplary embodiment, website 135 is reachable through computers that include a web browser or a software application, such as user device 110, using the Internet or other network. More specifically, website 135 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Computing devices hosting website 135 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, website 135 is a shopping website is associated with merchant 24 (shown in FIG. 1). In the exemplary embodiment, the shopping website 135 allows user 105 to purchase goods and/or services using user device 110. In some embodiments, payment transactions (as described with respect to FIG. 1) performed through shopping website 135 are considered card not present transactions and require authentication. Alternatively, website 135 is any suitable website that requests authentication of user 105, for example for purposes of authenticating a secure log-in.

In the exemplary embodiments, remote authentication requestor system 140 is in communication with one or more websites 135. In the exemplary embodiment, remote authentication requestor system 140 authenticates users 105 and user devices 110 as associated with proffered payment card accounts, usernames, and/or other identification credentials for performing actions and/or purchases on the one or more websites 135. In some embodiments, remote authentication requestor system 140 is in communication with passive authentication system 120 through passive authentication requestor 125 and is aware of passive authentication. In other embodiments, the remote authentication requestor system 140 is not aware of the passive authentication system

120 and requests authentication of the user 105 and/or the user device 110 from the user device 110. In the exemplary embodiment, remote authentication requestor system 140 is associated with the interchange network 28 (shown in FIG. 1). In other embodiments, the remote authentication requestor system 140 is independent from the interchange network 28, and may or may not be in communication with the interchange network 28.

A user profile database 145 may include a single database having separated sections or partitions, or may include multiple databases, each being separate from each other. The user profile database 145 may store user action data, user device condition data, and other device or user data generated by the user 105 interacting with the user device 110. The user profile database 145 may also store personal user data including at least one a user name, a user address, and one or more user preferences, which can be used to configure and identify the user profile. In some embodiments, the user profile database 145 is stored on the user device 110. In other embodiments, the user profile database 145 is stored remotely from the user device 110. In some embodiments, the user profile database 145 is decentralized.

In some embodiments, the device operating system 115 may receive a request to access the device. The device operating system 115 may transmit an authorization status request to the at least one passive authentication requestor 125, which may communicate with the passive authentication system 120 to determine if the user 105 is still authenticated since the last time the user 105 performed an active authentication. If the user 105 is still authenticated, the device operating system 115 may decide to unlock the user device 110 without requiring the user 105 to perform an additional active authentication.

Figure 3:
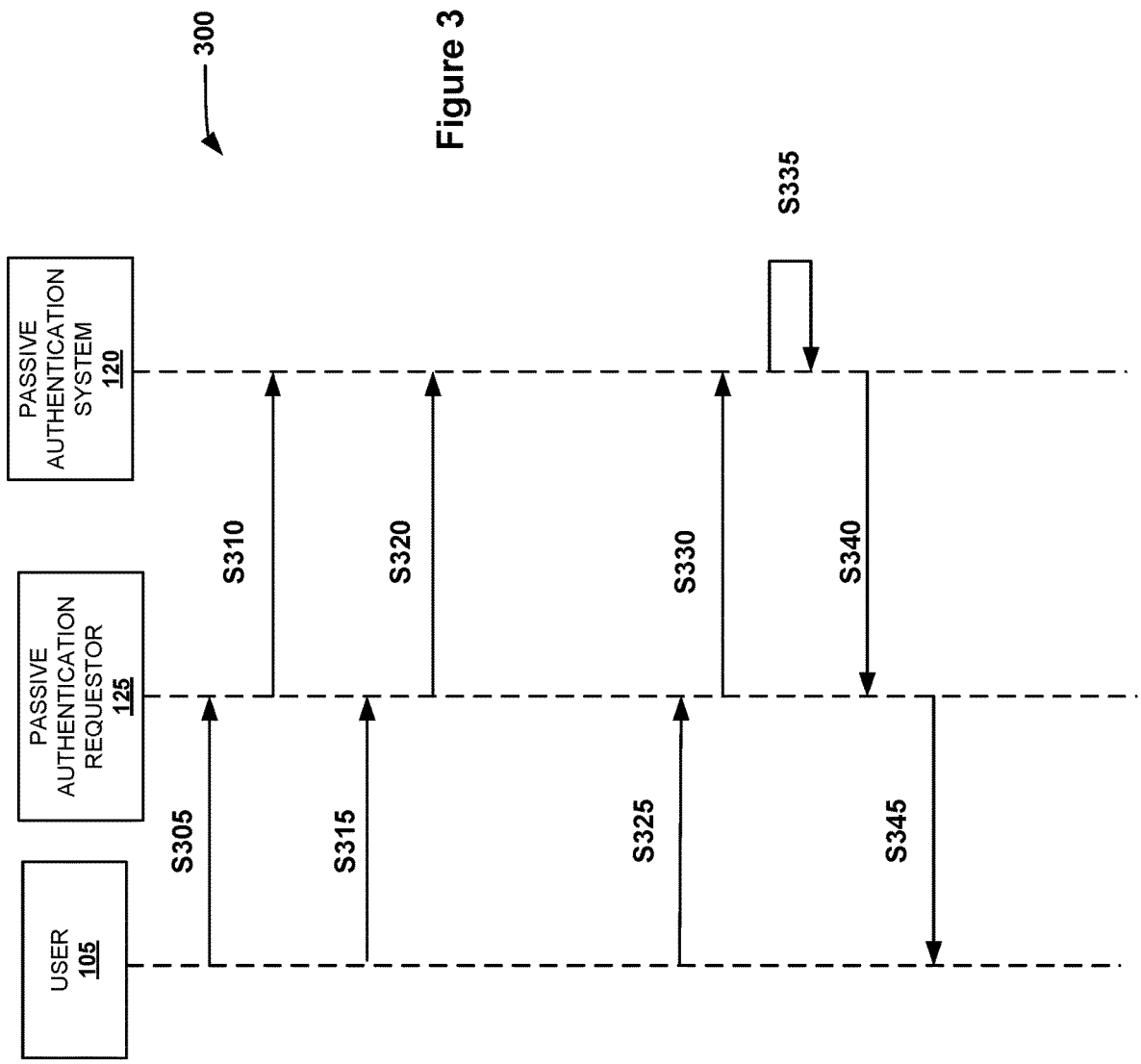

FIG. 3 illustrates an example process 300 for performing passive authentication using the system 200 (shown in FIG. 2). Process 300 illustrates the timing and communication between the user 105, the passive authentication requestor 125 and the passive authentication system 120 in accordance with at least one embodiment.

With reference to FIGS. 2 and 3, process 300 is divided up into several sequences. In the first sequence, which includes Steps S305 and S310, the user 105 performs an active authentication. In Step S305, the user 105 interacts with the user device 110 to perform the active authentication. For example, the user 105 presses his fingerprint to a scanner to unlock the user device 110 or enters a pin code or password. The passive authentication requestor 125 captures data indicative of this action, for example from the device operating system 115. In Step S310, the passive authentication requestor 125 passes an indication to the passive authentication system 120 that the user 105 successfully performed an active authentication. In some embodiments, the passive authentication requestor 125 provides details about the active authentication, such as type, degree of confidence, and any other information desired. In other embodiments, the passive authentication requestor 125 simply informs the passive authentication requestor 125 that a successful active authentication occurred. In response to the notification of the successful active authentication, passive authentication system 120 sets the authentication state for the user to "authenticated."

In some embodiments, the passive authentication requestor 125 informs the passive authentication system 120 when a failed active authentication occurred. In response to a failed active authentication, the passive authentication system 120 sets the authentication state for the user to "not authenticated."

In the second sequence, the user 105 interacts S315 with the user device 110 to perform general tasks (i.e., tasks not related to active authentication). This interaction may include, but is not limited to, activating one or more applications, connecting to a wireless network or wireless device, and/or moving the location and/or changing the orientation of user device 110. The passive authentication requestor 125 captures data indicative of these interactions and passes S320 the interaction data to the passive authentication system 120. The passive authentication system 120 compares the interaction data to the user profile and updates the authentication state. More specifically, if the interaction data is consistent with the user profile, then the passive authentication system 120 maintains the authentication state at "authenticated." If the interaction is not consistent with the user profile, then the passive authentication system 120 switches the authentication state to "not authenticated."

It should be understood that "consistency" with the user profile does not require a perfect match of the interaction data with the user profile. Rather, the determination of consistency is based on how much the user interaction data deviates from the typical interactions outlined in the user profile. For example, if the user profile indicates that the user 105 normally browses a sports website around 12:30 PM every work day, but the user 105 instead browses a shopping website for appliances at that time, the passive authentication system 120 may nevertheless determine that the current interaction data is consistent with the user profile based on other details. For example, if the user device 110 remains connected to the user's work Wi-Fi, the GPS component of the user device 110 remains at the location of the user's workplace, and the user device 110 remains connected to the user's smart watch, then the passive authentication system 120 determines an overall consistency with the user profile despite the mismatch in browsing behavior, and maintains the authentication state as "authenticated."

In some embodiments, some connections and conditions in the interaction data may be weighted more heavily than others. For example, device 110 being connected to the user's smart watch may be weighted more heavily towards a state of "authenticated" than being connected to the user's work Wi-Fi, as a fraudster at the user's workplace could likely use the device outside the presence of user 105 in the latter instance, but likely not in the former instance. Additionally or alternatively, any suitable factors and weighting schemes may be considered in determining whether or not the user device 110 is in the presence of, and being used by, the user 105. For example, in certain embodiments, the passive authentication system 120 uses a fuzzy logic algorithm to compare the various aspects of the interaction data against the user profile and arrive at the authentication state.

In certain embodiments, the passive authentication system 120 implements a machine learning algorithm to continuously upgrade the accuracy of the comparison of interaction data against the user profile. For example, if the passive authentication system 120 returns a "not authenticated" state based on a set of current interaction data, passive authentication requestor 125 in response causes user device 110 to prompt user 105 for an active authentication, and the user 105 immediately and successfully performs the active authentication, the machine learning algorithm may automatically adjust the weighting of various aspects of the interaction data to cause the passive authentication system 120 to better recognize that the user 105 has remained in control of device 110 based on that set of current interaction data.

In the third sequence, the user 105 requests S325 access to a resource that requires authentication. For example, user 105 selects or otherwise requests, for example via the device operating system 115, access to secure application 130 resident on user device 110, such as a banking application, a digital wallet, and/or stored payment card information. The secure application 130 passes the request to the passive authentication requestor 125, for example via the device operating system 115. The passive authentication requestor 125 requests S330 the current authentication state of the user 105 from the passive authentication system 120. For another example, user 105 attempts to log in to, or selects a "pay now" control, on website 135. Website 135 invokes the corresponding remote authentication requestor system 140, which communicates with the passive authentication requestor 125 to authenticate the user 105. The passive authentication requestor 125 requests S330 the current authentication state of the user 105 from the passive authentication system 120.

In the exemplary embodiment, prior to receiving the request S330, the passive authentication system 120 has been continuously receiving the interaction data since the last active authentication by user 105, and internally updating the authentication state, as described above. In response to the request S330 from the passive authentication requestor 125, the passive authentication system 120 determines S335 the current authentication state of the user 105, as it stands based on the most current update. The passive authentication system 120 then returns S340 the authentication state to the passive authentication requestor 125. If the returned state is "authenticated," passive authentication requestor 125 reports to the requesting resource (e.g., secure application 130 or remote authentication requestor system 140) that the user 105 is authenticated, without any active authentication steps by the user 105 subsequent to the request S325, and access is granted to user 105.

In some embodiments, if the returned state at step S340 is "not authenticated," the passive authentication requestor 125 then causes, for example via the device operating system 115 and/or another authentication system (not shown) associated with the user device 110, a prompt to be displayed S345 by user device 110 for the user to perform an active authentication on user device 110. If the user 105 successfully performs the active authentication, passive authentication requestor 125 informs the requesting resource that the user 105 is authenticated, and access is granted to user 105. Alternatively, if the active authentication is not completed, passive authentication requestor 125 informs the requesting resource that the user 105 is not authenticated, and access is denied.

Authentication process 300 enables authenticating the user 105 as a legitimate user of secure application 130, or of a payment account or log-in credentials at remote website 135, based on interactions captured passively (i.e., captured during independent, routine activity of the user 105 and without prompting or requiring authentication-specific actions by the user) by passive authentication requestor 125, avoiding the requirement by conventional systems to ask additional questions of the user 105 (e.g., as part of a step-up challenge) or request additional, authentication-specific inputs (e.g., facial scan) from the user 105. Thus, authentication process 300 enables authentication of the user 105 to be maintained without diverting computing resources of computing device 110 for multiple active authentications. Authentication process 300 also reduces or eliminates friction inherent in the conventional authentication process. Moreover, because the passive authentication system 120 has been continuously and passively updating the authentication state in the background since the last active authentication by the user 105, response time between the request S325 for access to the resource and the report at S340 of authentication state is improved relative to conventional systems.

Figure 4:
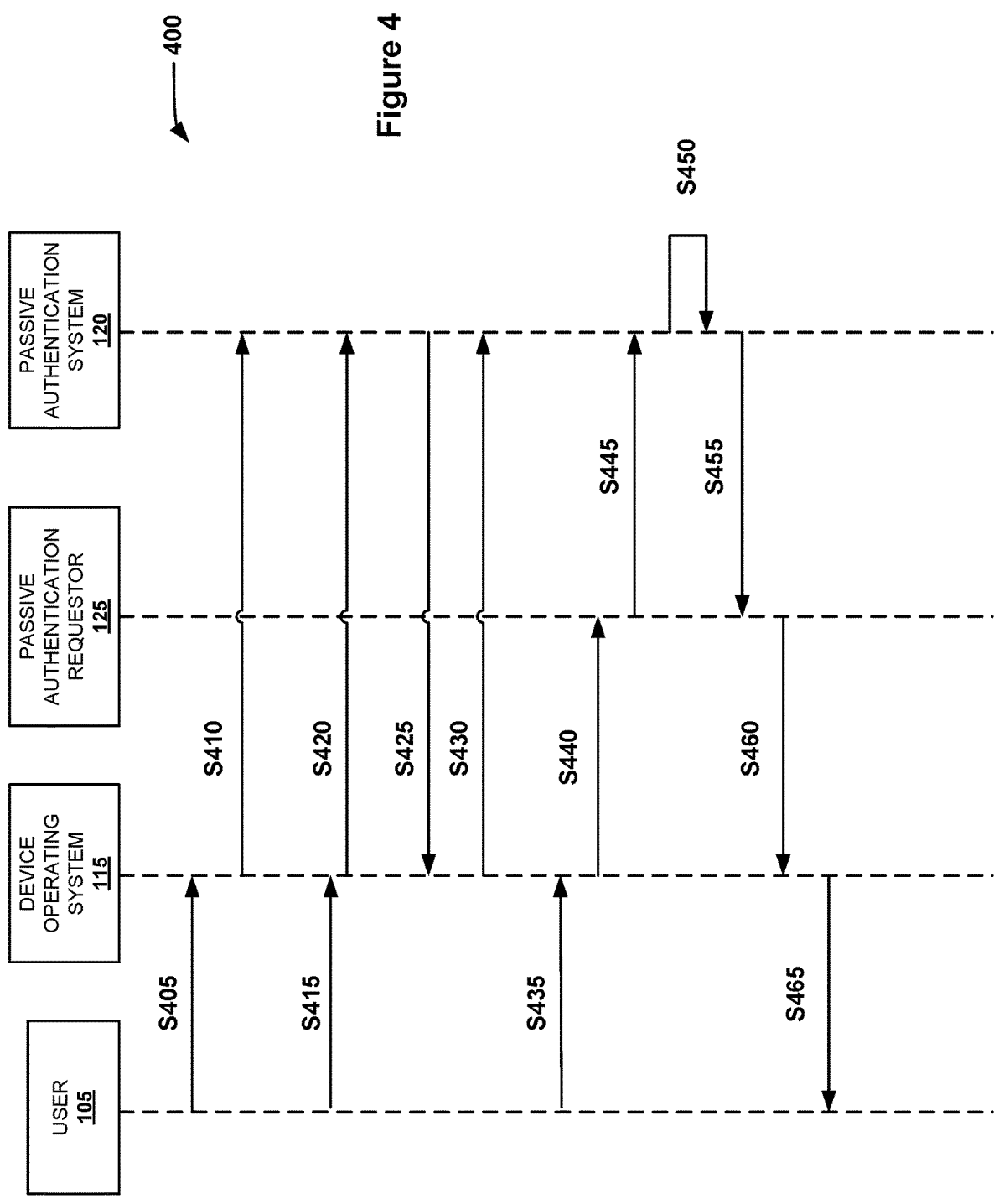

FIG. 4 illustrates another example process 400 for performing passive authentication using the system 200 (shown in FIG. 2). Process 400 illustrates the timing and communication between the user 105, the passive authentication requestor 125, and the passive authentication system 120 in accordance with at least one embodiment.

With reference to FIGS. 2 and 3, process 400 is divided up into several sequences. In the first sequence, which includes Steps S405 and S410, the user 105 performs an active authentication. In Step S405, the user 105 interacts with the user device 110 to perform the active authentication. For example, the user 105 presses his fingerprint to a scanner to unlock the user device 110 or the user enters a pin code or password. In the exemplary embodiment, the device operating system 115 captures data indicative of this action. In Step S410, the device operating system 115 communicates directly with the passive authentication system 120 to inform the passive authentication system 120 that the user 105 successfully performed an active authentication. In some embodiments, the device operating system 115 provides details about the active authentication, such as type, degree of confidence, and any other information desired. In other embodiments, the device operating system 115 simply informs the passive authentication system 120 that a successful active authentication occurred. In response to the notification of the successful active authentication, the passive authentication system 120 sets the authentication state for the user to "authenticated." Alternatively, the passive authentication requestor 125 captures the data indicative of the active authentication from device operating system 115 and communicates with the passive authentication system 120.

In some embodiments, the device operating system 115 (or, alternatively, the passive authentication requestor 125) informs the passive authentication system 120 when a failed active authentication occurred. In response to a failed active authentication, the passive authentication system 120 sets the authentication state for the user to "not authenticated."

In the second sequence, the user 105 interacts S415 with the user device 110 to perform general tasks, i.e., tasks not related to active authentication. This interaction can include, but is not limited to, activating one or more applications, connecting to a wireless network or wireless device, and/or moving the location and/or changing the orientation of user device 110. The device operating system 115 captures data indicative of these interactions and transmits S420 the interaction data to the passive authentication system 120. Alternatively, the passive authentication requestor 125 captures the interaction data from device operating system 115 and communicates the interaction data to the passive authentication system 120. The passive authentication system 120 compares the interaction data to the user profile and updates the authentication state. More specifically, if the interaction data is consistent with the user profile, then the passive authentication system 120 maintains the authentication state at "authenticated." If the interaction is not consistent with the user profile, then the passive authentication system 120 switches the authentication state to "not authenticated." As explained above, "consistency" with the user profile does not require a perfect match of the interaction data with the user profile. The passive authentication system 120 again may implement any suitable factors, weighting, fuzzy logic, and/or machine learning as discussed above with respect to FIG. 3, for example.

In the third sequence, the passive authentication system 120 requests S425 condition information from the device operating system 115. For example, the condition information includes one or more device attributes, such as, but not limited to, device location (GPS coordinates), amount of battery charge, wireless connections, device orientation, and active applications. The device operating system 115 captures and provides S430 the requested condition information to the passive authentication system 120. The passive authentication system 120 compares the condition information to the user profile to determine if the condition information is consistent with the user profile. The passive authentication system 120 then uses this comparison to determine if the "authenticated" state of user 105 is maintained. The passive authentication system 120 may implement suitable factors, weighting, fuzzy logic, and/or machine learning in the evaluation of the condition data, similar to as discussed above with respect to the interaction data in FIG. 3, for example. In some embodiments, the condition information is considered in combination with the interaction data during the comparison to the user profile. In other embodiments, the condition information and the interaction data are considered separately during the comparison to the user profile. For example, a determined inconsistency between the user profile and either one of the condition data and the interaction data causes the passive authentication system 120 to switch the authentication state to "not authenticated." In the exemplary embodiment, the third sequence is repeated on a periodic basis to capture any changes in, for example, various aspects of the device data.

In the fourth sequence, the user 105 requests S435 access to a resource that requires authentication. For example, user 105 selects or otherwise requests, for example via the device operating system 115, access to secure application 130 resident on user device 110, such as a banking application, a digital wallet, and/or stored payment card information. The secure application 130 passes S440 the request to the passive authentication requestor 125, for example via the device operating system 115. The passive authentication requestor 125 requests S445 the current authentication state of the user 105 from the passive authentication system 120. For another example, user 105 attempts to log in to, or selects a "pay now" control, on website 135. Website 135 invokes the corresponding remote authentication requestor system 140, which communicates S440 with the passive authentication requestor 125, for example via the device operating system 115, to authenticate the user 105. The passive authentication requestor 125 requests S445 the current authentication state of the user 105 from the passive authentication system 120.

In the exemplary embodiment, prior to receiving the request S435, the passive authentication system 120 has been continuously receiving the interaction data and periodically pulling the condition data since the last active authentication by user 105, and internally updating the authentication state, as described above. In response to the request S445 from the passive authentication requestor 125, the passive authentication system 120 determines S450 the current authentication state of the user 105, as it stands based on the most current update. The passive authentication system 120 then returns S455 the authentication state to the passive authentication requestor 125. If the returned state is "authenticated," passive authentication requestor 125 informs the requesting resource (e.g., secure application 130 or remote authentication requestor system 140) that the user 105 is authenticated, without requiring any active authentication steps by the user 105, and access is granted to user 105.

In some embodiments, if the returned state at step S455 is "not authenticated," the passive authentication requestor 125 then causes S460, for example via the device operating system 115 and/or another authentication system (not shown) associated with the user device 110, a prompt to be displayed S465 by user device 110 for the user to perform an active authentication on user device 110. If the user 105 successfully performs the active authentication, passive authentication requestor 125 reports to the requesting resource that the user 105 is authenticated, without any active authentication steps by the user 105 subsequent to the request S440, and access is granted to user 105. Alternatively, if the active authentication is not completed, passive authentication requestor 125 informs the requesting resource that the user 105 is not authenticated, and access is denied.

Authentication process 400 enables authenticating the user 105 as a legitimate user of secure application 130, or of a payment account or log-in credentials at remote website 135, based on interactions and device data captured passively (i.e., captured during independent, routine activity of the user 105 and without prompting or requiring authentication-specific actions by the user) by passive authentication requestor 125, avoiding the requirement by conventional systems to ask additional questions of the user 105 (e.g., as part of a step-up challenge) or request additional, authentication-specific inputs (e.g., facial scan) from the user 105. Thus, authentication process 400 enables authentication of the user 105 to be maintained without diverting computing resources of computing device 110 for multiple active authentications. Authentication process 400 also reduces or eliminates friction inherent in the conventional authentication process. Moreover, because the passive authentication system 120 has been continuously and passively updating the authentication state in the background since the last active authentication by the user 105, response time between the request S435 for access to the resource and the report at S455 of authentication state is improved relative to conventional systems.

Figure 5:
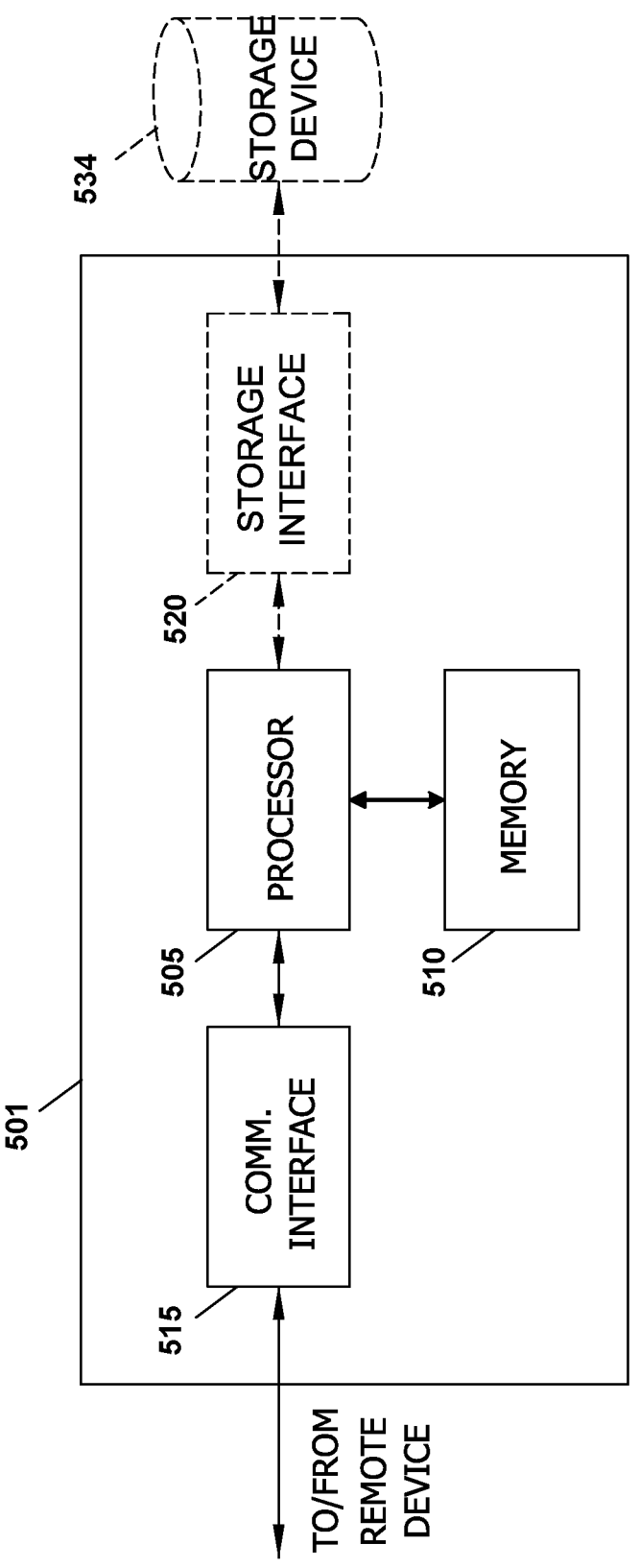

FIG. 5 illustrates an example configuration of a server system 501 that may be used to implement, for example, a server of interchange network 28 (shown in FIG. 1), remote authentication requestor system 140 (shown in FIG. 2), and/or website 135 (shown in FIG. 2). In the example embodiment, server system 501 determines and analyzes characteristics of devices used in payment transactions, as described below.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests from user device 110 (shown in FIG. 2) via the Internet.

Processor 505 may also be operatively coupled to a storage device 534. Storage device 534 is any computer-operated hardware suitable for storing and/or retrieving data. In some embodiments, storage device 534 is integrated in server system 501. For example, server system 501 may include one or more hard disk drives as storage device 534. In other embodiments, storage device 534 is external to server system 501 and may be accessed by a plurality of server systems 501. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
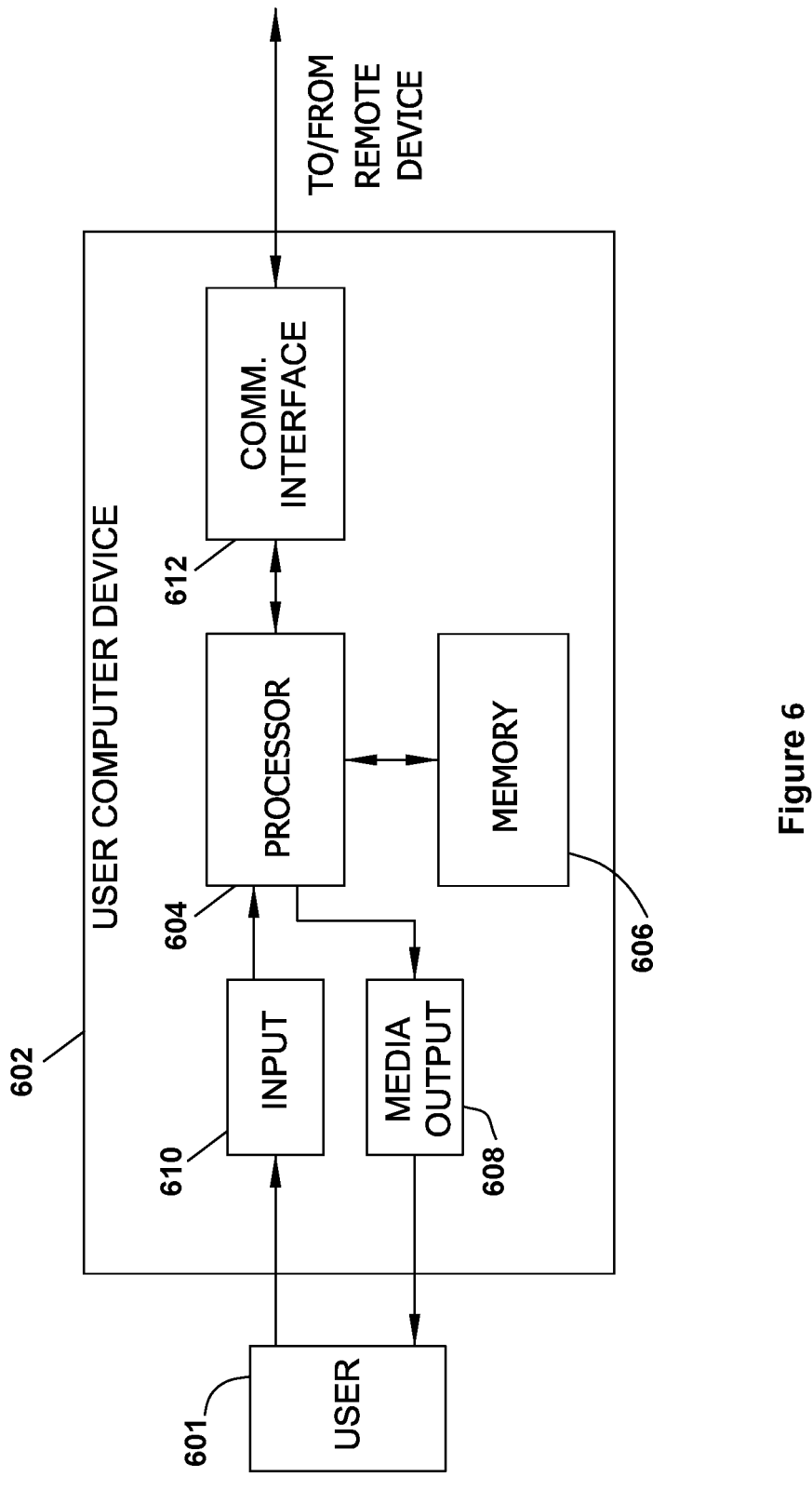

FIG. 6 illustrates an example configuration of a client computing device 602 that may be used to implement, for example, user device 110 (shown in FIG. 2). Client computing device 602 includes a processor 604 for executing instructions. In some embodiments, executable instructions are stored in a memory area 606. Processor 604 may include one or more processing units (e.g., in a multi-core configuration). Memory area 606 is any device allowing information such as executable instructions and/or other data to be stored and retrieved. Memory area 606 may include one or more computer-readable media.

Client computing device 602 also includes at least one media output component 608 for presenting information to a user 600. Media output component 608 is any component capable of conveying information to user 600. In some embodiments, media output component 608 includes an output adapter such as a video adapter and/or an audio adapter. An output adapter is operatively coupled to processor 604 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 602 includes an input device 610 for receiving input from user 600. Input device 610 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 608 and input device 610.

Client computing device 602 may also include a communication interface 612, which is communicatively coupleable to a remote device such website 135 (shown in FIG. 2) operated by merchant 24 (shown in FIG. 1), and/or the remote authentication requestor system 140 (shown in FIG. 2). Communication interface 612 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing risk.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer device configured to passively authenticate a user, the computer device comprising:

a memory device including a user profile based upon a plurality of interactions between the user and the computer device, wherein the user profile includes a standard routine of interactions between the user and the computer device during a plurality of periodically recurring intervals of time as well as a state of the computer device during the plurality of periodically recurring intervals of time, the state of the computer device within each of the periodically recurring intervals of time including at least one of: an orientation of the computer device, an amount of charge of the computer device, one or more wireless networks connected to the computer device, or one or more wireless devices connected to the computer device; and at least one processor coupled to the memory device, the at least one processor programmed to execute a passive authentication system, the passive authentication system programmed to:

receive an indication that the user successfully performed a first active authentication by interacting with the computing device;

set an authentication state of the user as authenticated in response to the successful first active authentication;

store the authentication state of the user in the memory device;

continuously or periodically receive sets of interaction data, each set of interaction data indicative of one or more interactions between the user and the computer device that were performed independent of any authentication, after the indication of the successful first active authentication;

in response to receiving each set of interaction data:

compare the respective one or more interactions and the state of the computer device during the one or more interactions to the user profile to determine if there is a match;

when there is a match, maintain the authentication state of the user and stored in the memory device as authenticated; and when there is not a match, update the authentication state of the user and stored in the memory device to not authenticated;

receive an authentication request for the user based on the user attempting to initiate an access to a secure resource or action, the access requiring the user be authenticated independent of the first active authentication;

in response to receiving the authentication request, retrieve the authentication state of the user from the memory device;

if the retrieved authentication state is authenticated, report a successful authentication in response to the authentication request, indicating the user remains authenticated independent of the first active authentication; and if the retrieved authentication state is not authenticated, request the user perform a second active authentication.

2. The computer device in accordance with claim 1, wherein the passive authentication system is further programmed to:

prior to receiving the sets of interaction data, receive an earlier plurality of interaction data over a period of time; and determine the user profile based on the earlier plurality of interaction data.

3. The computer device in accordance with claim 1, wherein the at least one processor is further programmed to:

receive the authentication request for the user from a requestor;

perform the second active authentication by causing the computing device to prompt the user to perform the second active authentication; and in response to the second active authentication being successfully performed, report to the requestor that the user is authenticated.

4. The computer device in accordance with claim 1, wherein the standard routine of interactions between the user and the computer device includes an interaction between the user and a same webpage during a same predesignated period of time during the day.

5. The computer device in accordance with claim 1, wherein the passive authentication system is further programmed to:

in response to requesting the user perform the second active authentication, receive a real-time, successful active authentication indicating the correct stored authentication state is authenticated; and train a machine learning algorithm to recognize one or more details of the one or more interactions as indicative of an authenticated state to reduce false negative passive authentications.

6. The computer device in accordance with claim 1, wherein the passive authentication system is further programmed to:

receive condition information of the computer device, the condition information including device data captured after the indication of the successful first active authentication; and compare the condition information to the user profile, wherein updating the authentication state is further based on the comparison of the condition information.

7. The computer device in accordance with claim 2, wherein the device data includes at least one of: a battery state of the computer device, a location of the computer device, the orientation of the computer device, a wireless connection to a network, or a wireless connection to another device in a user local environment.

8. The computer device in accordance with claim 1, wherein the at least one processor is further programmed to execute a passive authentication requestor programmed to:

perform (i) the receiving the authentication request, including receiving the authentication request from a requestor, and (ii) the retrieving the authentication state of the user from the memory device in response to receiving the authentication request; and report to the requestor that the user is authenticated without any active authentication steps by the user subsequent to the request from the requestor.

9. The computer device in accordance with claim 8, wherein the passive authentication requestor is further programmed to:

receive the request for authentication from the requestor being a secure application resident on the computing device.

10. The computer device in accordance with claim 8, wherein the passive authentication requestor is further programmed to:

receive the request for authentication from the requestor being a remote authentication requestor system associated with a remote website or computing system.

11. A method for passively authenticating a user, the method implemented via a computing device comprising a memory device, and at least one processor coupled to the memory device, wherein the method comprises:

storing a user profile based upon a plurality of interactions between a user and the computer device, wherein the user profile includes a standard routine of interactions between the user and the computer device during a plurality of periodically recurring intervals of time as well as a state of the computer device during the plurality of periodically recurring intervals of time, the state of the computer device within each of the periodically recurring intervals of time including at least one of: an orientation of the computer device, an amount of charge of the computer device, one or more wireless networks connected to the computer device, or one or more wireless devices connected to the computer device;

receiving an indication that the user successfully performed a first active authentication by interacting with the computing device;

setting an authentication state of the user as authenticated in response to the successful first active authentication;

storing the authentication state of the user in the memory device;

continuously or periodically receiving sets of interaction data, each set of interaction data indicative of one or more interactions between the user and the computer device that were performed independent of any authentication, after the indication of the successful first active authentication;

in response to receiving each set of interaction data:

comparing respective one or more interactions and the state of the computer device during the one or more interactions to the user profile to determine if there is a match;

when there is a match, maintaining the authentication state of the user and stored in the memory device as authenticated; and when there is not a match, updating the authentication state of the user and stored in the memory device to not authenticated;

receiving an authentication request for the user based on the user attempting to initiate an access to a secure resource or action, the access requiring the user be authenticated independent of the first active authentication;

in response to receiving the authentication request, retrieving the authentication state of the user from the memory device;

if the retrieved authentication state is authenticated, reporting a successful authentication in response to the authentication request, indicating the user remains authenticated independent of the first active authentication; and if the retrieved authentication state is not authenticated, requesting the user perform a second active authentication.

12. The method in accordance with claim 11 further comprising:

prior to receiving the sets of interaction data, receiving an earlier plurality of interaction data over a period of time; and determining the user profile based on the earlier plurality of interaction data.

13. The method in accordance with claim 11 further comprising:

receiving the authentication request from a requestor;

performing the second active authentication by causing the computing device to prompt the user to perform the second active authentication; and in response to the second active authentication being successfully performed, reporting to the requestor that the user is authenticated.

14. The method in accordance with claim 11 further comprising:

receiving condition information of the computing device, the condition information including device data captured after the indication of the successful first active authentication; and comparing the condition information to the user profile, wherein updating the authentication state is further based on the comparison of the condition information.

15. The method in accordance with claim 14, wherein the device data includes at least one of: a battery state of the computing device, a location of the computing device, the orientation of the computing device, a wireless connection to a network, or a wireless connection to another device in a user local environment.

16. The method in accordance with claim 11 further comprising:

performing (i) the receiving the authentication request, including receiving the authentication request from a requestor, and (ii) the retrieving the authentication state of the user from the memory device in response to receiving the authentication request; and reporting to the requestor that the user is authenticated without any active authentication steps by the user subsequent to the request from the requestor.

17. The method in accordance with claim 16, wherein the receiving the request for authentication comprises further comprising receiving the request for authentication from the requestor being a secure application resident on the computing device.

18. The method in accordance with claim 16, wherein the receiving the request for authentication comprises further comprising receiving the request for authentication from the requestor being a remote authentication requestor system associated with a remote website or computing system.

19. A non-transitory computer-readable storage medium having computer-executable instructions embodied thereon, wherein when executed by a computing device comprising a processor communicatively coupled to a memory, the computer-executable instructions cause the computing device to:

store a user profile based upon a plurality of interactions between a user and the computer device, wherein the user profile includes a standard routine of interactions between the user and the computer device during a plurality of periodically recurring intervals of time as well as a state of the computer device during the plurality of periodically recurring intervals of time, the state of the computer device within each of the periodically recurring intervals of time including at least one of: an orientation of the computer device, an amount of charge of the computer device, one or more wireless networks connected to the computer device, or one or more wireless devices connected to the computer device;

receive an indication that a user successfully performed a first active authentication by interacting with the computing device;

set an authentication state of the user as authenticated in response to the first successful active authentication;

store the authentication state of the user in the memory;

continuously or periodically receive sets of interaction data, each set of interaction data indicative of one or more interactions between the user and the computer device that were performed independent of any authentication, after the indication of the successful first active authentication;

in response to receiving each set of interaction data:

compare the respective one or more interactions and the state of the computer device during the one or more interactions to the user profile determine if there is a match;

when there is a match, maintain the authentication state of the user and stored in the memory as authenticated; and when there is not a match, update the authentication state of the user and stored in the memory to not authenticated;

receive an authentication request for the user based on the user attempting to initiate an access to a secure resource or action, the access requiring the user be authenticated independent of the first active authentication;

in response to receiving the authentication request, the authentication state of the user retrieve the authentication state of the user from the memory;

if the retrieved authentication state is authenticated, report a successful authentication in response to the authentication request, indicating the user remains authenticated independent of the first active authentication; and if the retrieved authentication state is not authenticated, request the user perform an active authentication.

20. The non-transitory computer-readable storage media of claim 19, the computer-executable instructions further cause the processor to:

receive condition information of the computer device, the condition information including device data captured after the indication of the successful first active authentication; and compare the condition information to the user profile, wherein updating the authentication state is further based on the comparison of the condition information.

* * * * *